F. Ortleib,

Rotary Engine.

No. 98,619. Patented Jan. 4, 1870.

Witnesses:

Inventor:

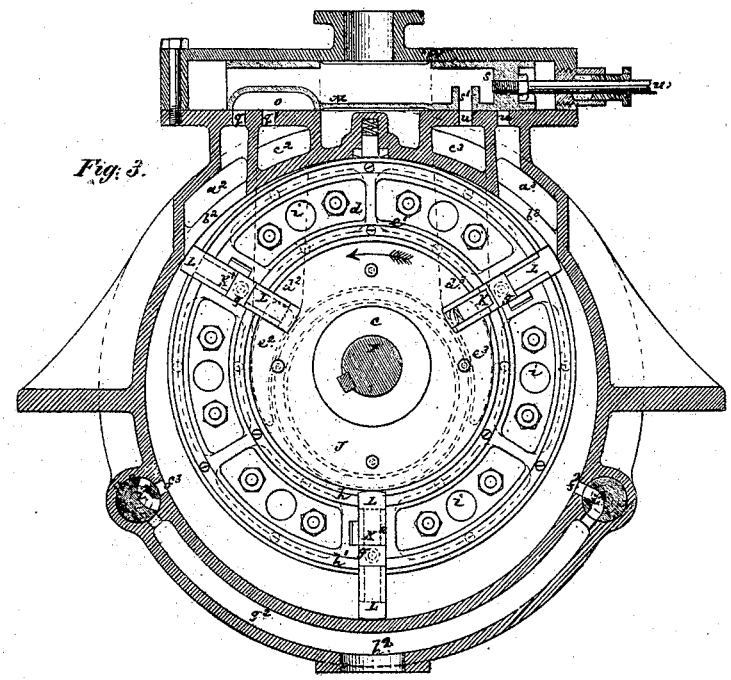
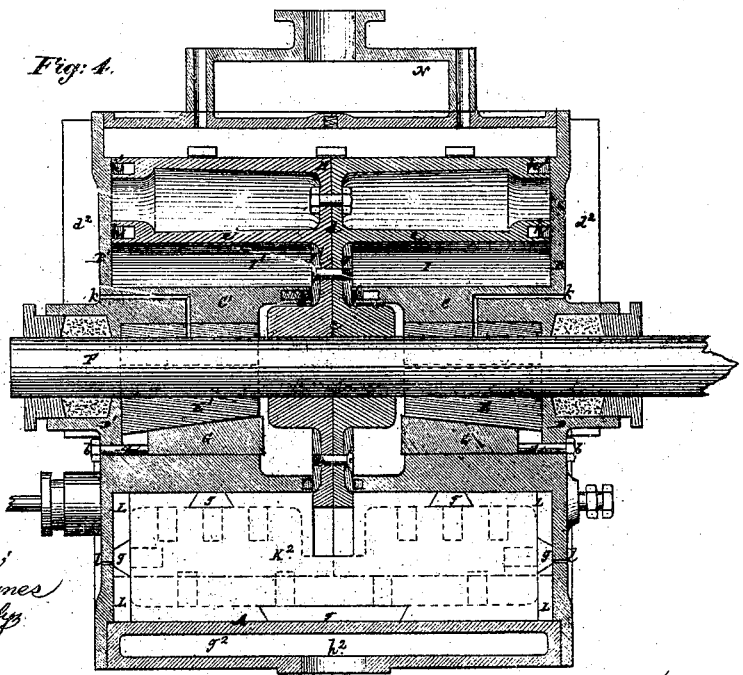

F. Ortlieb,

Rotary Engine.

No. 98,619. Patented Jan. 4, 1870.

3 Sheets, Sheet 2.

Witnesses:
Fred Hayner
M. J. Shauly

Inventor,
F. Ortlieb

United States Patent Office.

FREDERICK ORTLIEB, OF GREEN POINT, NEW YORK.

Letters Patent No. 98,619, dated January 4, 1870.

IMPROVEMENT IN ROTARY ENGINES.

The Schedule referred to in these Letters Patent and making part of the same.

To all whom it may concern:

Be it known that I, FREDERICK ORTLIEB, of Green Point, in the county of Kings, and State of New York, have invented a new and useful Improvement in Rotary Engines, of which the following is a full, clear, and exact description, reference being had to the accompanying drawings, forming part of this specification, and in which—

Figure 1:
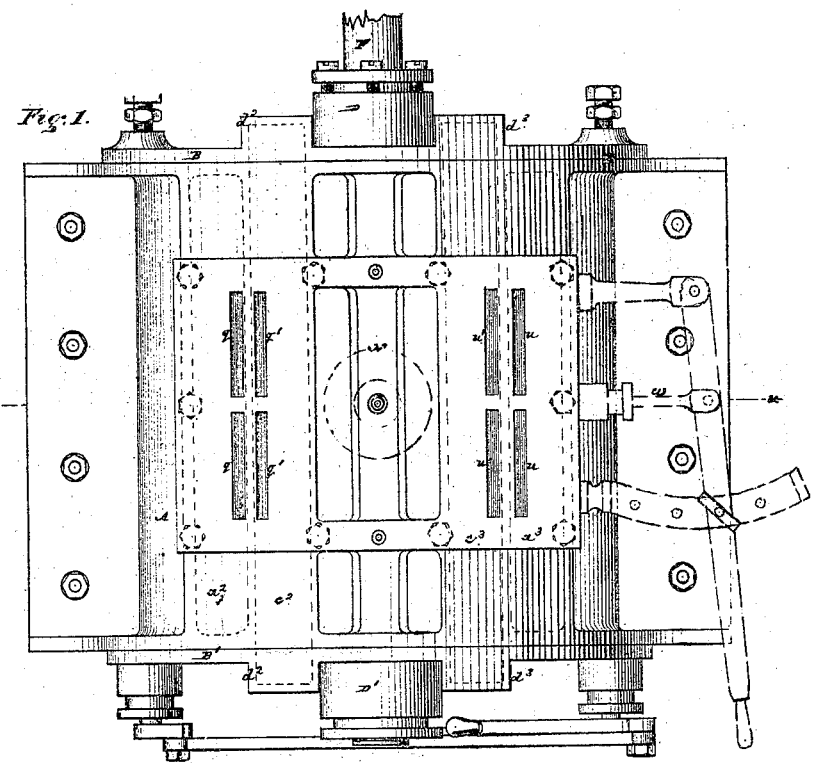
Figure 1 represents a plan, in part, of a rotary engine constructed in accordance with my invention, the box to the main valve, and devices for adjusting the latter, being shown by long dotted lines.

Figure 3, a transverse section thereof, taken mainly as indicated by the line $x\ x$ in fig. 1, but showing the piston in full.

Figure 2:
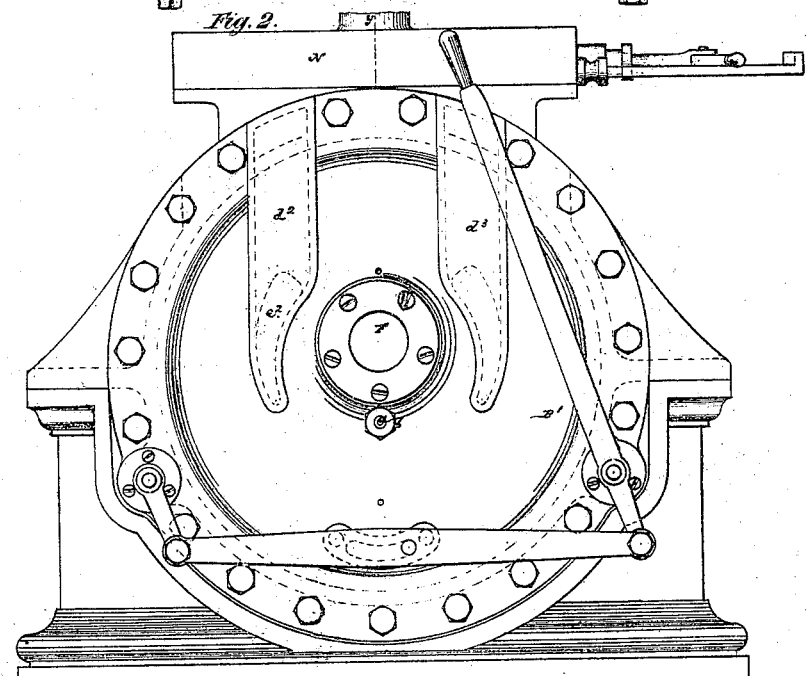
Figure 2 is an end elevation of said engine.

Figure 4, a longitudinal section, mainly taken as denoted by the line $y\ y$ in fig. 2.

Figure 5:
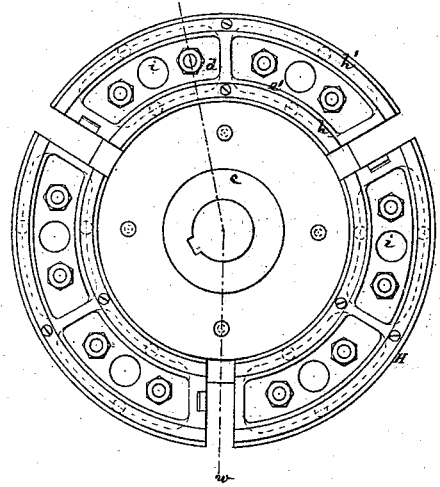

Figure 5, an end view of the skeleton piston, with its segmental packings, and showing the openings for establishing a balance in case of breakage.

Figure 6:
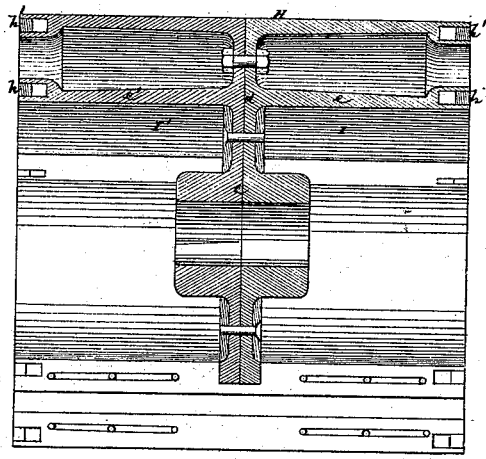

Figure 6, a longitudinal view of the same, through the line $w\ w$ in fig. 5.

Figure 7:
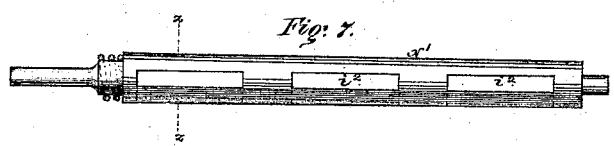

Figure 7, a longitudinal view of one of the exhaust-valves, detached, and

Figure 8:

Figure 8, a transverse section thereof, through the line $z\ z$ in fig. 7.

Figure 9:
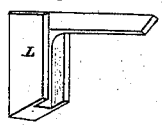

Figure 9 is a view, in perspective, of one of the packing-caps to the ends of the radial slides carried by the piston.

Similar letters of reference indicate corresponding parts.

My improvement relates to engines constructed to operate substantially as described in Letters Patent of the United States, No. 71,208, issued to me, November 19, 1867; and The invention consists in certain peculiarities of construction, including the application of a main controlling-valve, having a fourfold function to work the engine under different conditions or uses of the steam, whereby the efficiency and utility of the engine are greatly improved.

Referring to the accompanying drawing—

A represents the outer cylinder or case of the engine, and B B, its end lids or covers, formed with central cylindrical projections C C', having tubular passages through them and the cylinder-covers, in directions which are eccentric to but parallel with the axis of the cylinder A, for the reception of the stuffing-boxes D D', and inside bearings E E', of a longitudinally-divided bush-form, within and through which the engine-shaft F works.

The lower half of each of these bearings E E' is made adjustable, to meet near and provide for set of the main shaft F, by means of a sliding wedge or inclined packing-piece G, having a pin, $a$, projecting from it to the outside of the cylinder-cover, for the purpose of raising or lowering said half bearing by turning a nut, $b$, arranged to fit the pin $a$ outside the cylinder-cover.

The piston or revolving cylinder H, which carries the radial slides, is of skeleton-form or build, and may either be made entire, or be divided transversely of its length and bolted together, as represented in figs. 4 and 6, said piston H comprising a hub, $c$, by which it is secured to the shaft F, centrally-dividing disk $d$, and an inner ring, $e\ e^1$, the latter, in connection with the cylindrical projections C C', forming interior steam-spaces I I' that constitute the inner cylinder of the engine, while the space between the outer periphery of the piston and exterior case A, forms the outer cylinder thereof.

The ends of the cylindrical projections C C' are furnished with spring-borne packing-rings $f f^1$, which bear or press against plates J J', arranged to lie against and cover either side or face of the dividing-disk $d$, between the hub $c$ and inner ring $e\ e^1$ of the piston, and bolted to said disk so as to rotate with the piston.

By means of the packing-rings $f f^1$, leakage is generally prevented from or through the piston in an internal or central direction.

K K¹ K² are the radial slides, of which there may be any suitable number, arranged on opposite sides of the dividing-disk $d$. These slides are disposed at an equal distance apart, and are provided with suitable edge-packings, made up in part of interposed wedges, acted upon by springs at their backs. These packings, however, are of peculiar construction at the end-portions of the slides, the same being composed of packing-caps L L, with interposed wedges.

These caps L L are of such a width, and made to embrace the angular extremities or ends of the slides, so that when working in concert with the interposed spring-borne wedges $g\ g\ g$, that serve to control their radial and end actions, they fill the gaps or spaces lying between the ends of inner and outer segmental packings $h\ h^1$, acted upon by springs at their backs, and arranged within grooves made in the faces or ends of the revolving piston, to pack the latter in circular directions as regards its travel over or against the inner faces of the cylinder-covers.

To provide against leakage past the segmental packings $h\ h^1$ in the ends of the piston, and to prevent the piston being forced endwise by an excess of leak on one side or end, over or as compared with the other, the disk-portion $d$ of the piston is made with any suitable number of balance-openings $i$, which permit of the leaking steam passing through the disk, so as to press equally on opposite sides of the latter and on both cylinder-covers, and thereby to establish an equilibrium.

$k\ k$ are oil-injecters or lubricating-passages to the main shaft, and $l\ l$, similar devices or provisions to the piston.

M is a slide-valve, designed to be operated by hand, lever, or otherwise, through its stem or rod $w$.

Said valve is constructed at its one end with a D-shaped bonnet, $o$, which covers, and, in the adjustment of the valve, plays over ports $q$ $q'$ in the valve-seat, while the other end of said valve consists of a block or plate, $s$, having a passage, $s'$, through it, and controlling-ports $u$ $u'$.

Each of these ports, $q$ $q'$ and $u$ $u'$, may be in duplicate, as represented in fig. 1. The one set, $q$, of them communicates with a passage, $a^2$, running crosswise of the outer cylinder A, and connecting, by openings $b^2$, with the interior of said cylinder, some little on one side of where the outer cylindrical portion of the piston H comes in contact with the cylinder A.

The ports $q'$ communicate with a passage, $c^2$, also running crosswise of the outer cylinder, and connecting with ways $d^2$ in the cylinder-ends or covers B B', said ways $d^2$ opening, by side-passages $e^2$, into the double inner cylinder I I'.

Similarly arranged on the opposite side of where the outer cylindrical portion of the piston H comes in contact with the cylinder A, are like or corresponding ways or passages $a^3$ $c^3$, openings $b^3$, ways $d^3$, and lateral openings $e^3$, the passages $a^3$ $c^3$ being in communication with the ports $u$ $u'$, openings $b^3$ with the interior of the cylinder A, and lateral openings $e^3$ with the double inner cylinder I I'.

By sliding the valve M from the position it is represented in the drawing, so as to put the opening $s'$ in or through it, out of communication with the port $u'$, and so that the several ports, $q$ $q'$ and $u$ $u'$, are closed by the valve, then the engine is stopped, as steam cannot pass from the valve-chest to either the inner or outer cylinders. On adjusting, however, said valve to the position shown in the drawing, then live steam, at a high pressure, passes from the valve-chest N, through the opening $s'$ and port $u'$, into the passage $c^3$, and from thence down the ways $d^3$, and through the lateral openings $e^3$, into the inner double cylinder I I', to act upon the piston H at a short leverage, through its radial slides K K$^1$ K$^2$, to rotate said piston and main or driving-shaft F, with which it is connected, in direction of the arrow, fig. 3.

After the live or high-pressure steam has performed its duty in said inner double cylinder I I', it passes, by the travel of the piston H, out through the lateral openings $e^2$, up the ways $d^2$, along the passages $c^2$, through the ports $q'$, into the bonnet $o$ of the valve, and from thence through the ports $q$, passages $a^2$, and openings $b^2$, to be worked expansively within the outer cylinder A, at a longer piston-leverage on the radial slides K K$^1$ K$^2$, such expanded steam, after it has performed its duty in the outer cylinder, finally escaping, by a passage or passages, $f^2$, out through an exhaust-valve, N$^1$, into a chamber or channel, $g^2$, arranged on the under side of the cylinder A, and from whence it may pass off, by an outlet, $h^2$, to the air or to a condenser.

From this description, too, it will be seen that the steam, after it has performed its duty in the inner double cylinder under full pressure, passes under cover of the valve M, which is kept warm by high-pressure steam on its back, to work expansively in the outer cylinder, by which arrangement the temperature and pressure of the steam, in its way from one cylinder to the other, is better preserved than if the same were conducted by outside passages, and not under cover of the valve.

In further description of the main valve M and exhaust-valves N$^1$ N$^2$, which latter, though independent of the main valve, are used in connection therewith, it will be observed that the exhaust-valves N$^1$ N$^2$ are arranged on opposite sides of the cylinder A.

Said valves are shown as formed with right-angled passages $i^2$ through them, so that on suitably turning said valves, they may be made either to close the cylinder-outlets $f^2$ $f^3$, and so cut off communication between the cylinder A and channel $g^2$; or to open communication between the same, and said valves, which are designed to be set by hand according to the direction in which it is required to run the engine, should be so linked or geared together, as that when the one valve is open the other is closed. In fig. 2 there is represented a suitable valve-motion for the purpose. Supposing the engine-piston to be travelling as indicated by arrow in fig. 3, then it is necessary that the valve N$^1$ should be opened and valve N$^2$ closed.

By shifting the valve M, so as to close the ports $u'$ and open the ports $q$ to the steam in the valve-chest, then the engine will work wholly under full or high pressure, in the same direction as before, the steam in such case only being admitted to the outer cylinder A, and, after having performed its duty, escaping by the outlet $f^2$, through the valve N$^1$, to the exhaust. Or again, by shifting the valve M in the reverse direction, so as to make the port $u$ the inlet in communication with the valve-chest, also closing the valve N$^1$ and opening the valve N$^2$, then the engine will work in a reverse direction under full or high-pressure steam, which is confined to the cylinder A, the same, after having completed its duty therein on the radial slides of the piston, escaping by the opening $f^3$, and through the valve N$^2$, to the exhaust. Thus the main valve M, or same in connection with the exhaust-valves N$^1$ N$^2$, may be said to have a fourfold function, namely, that of starting and stopping the engine, of causing the engine to be worked wholly under full or high pressure, of working it under full pressure as regards the one cylinder, and expansively as regards the other, and of reversing the direction in travel of the engine. This versatility in action of the engine will prove very advantageous in numerous instances.

What is here claimed, and desired to be secured by Letters Patent, is—

1. The combination of a main or controlling-valve, M, constructed to operate substantially as described, with the inner and outer cylinders of the engine and ports $u$ $u'$ and $q$ $q'$, together with their respective passages, connecting the valve-chest or space with said cylinders, essentially as specified.

2. The combination of a duplicate exhaust-valve or valves, N N$^1$, with the main or controlling-valve M, and the inner and outer cylinders of the engine, substantially as shown and described.

3. The skeleton piston H, provided with balance-openings $i$, and carrying radial slides or pistons proper, in combination with the inner and outer cylinders of the engine, substantially as specified.

FRED. ORTLIEB.

Witnesses:
 FRED. HAYNES,
 HENRY PALMER.